United States Patent
Zhang

(10) Patent No.: US 11,959,821 B2
(45) Date of Patent: Apr. 16, 2024

(54) COMPREHENSIVE TEST PLATFORM FOR FLUORESCENCE MICROSCOPE OBJECTIVE LENSES

(71) Applicant: MOONLIGHT (NANJING) INSTRUMENT CO., LTD., Jiangsu (CN)

(72) Inventor: Bin Zhang, Nanjing (CN)

(73) Assignee: MLOptic Corp., Redmond, WA (US)

(*) Notice: Subject to any disclaimer, the term of this patent is extended or adjusted under 35 U.S.C. 154(b) by 118 days.

(21) Appl. No.: 17/616,172

(22) PCT Filed: May 20, 2020

(86) PCT No.: PCT/CN2020/091355
§ 371 (c)(1),
(2) Date: Dec. 2, 2021

(87) PCT Pub. No.: WO2021/135048
PCT Pub. Date: Jul. 8, 2021

(65) Prior Publication Data
US 2022/0341811 A1 Oct. 27, 2022

(30) Foreign Application Priority Data
Dec. 31, 2019 (CN) .......... 201911425206.8

(51) Int. Cl.
*G01M 11/02* (2006.01)
(52) U.S. Cl.
CPC .............. *G01M 11/0207* (2013.01)

(58) Field of Classification Search
CPC ................................. G01M 11/0207
See application file for complete search history.

(56) References Cited

U.S. PATENT DOCUMENTS 5,955,739 A * 9/1999 Kawashima .......... G03F 9/7026
  250/559.22
6,813,001 B2 * 11/2004 Fujisawa ............... G03F 9/7034
  355/53

(Continued)

FOREIGN PATENT DOCUMENTS

CN 107063638 A * 8/2017
CN 207472539 U * 6/2018

(Continued)

*Primary Examiner* — Octavia Davis Hollington
(74) *Attorney, Agent, or Firm* — Jong Patent Firm; Cheng Ning Jong; Tracy P. Jong

(57) ABSTRACT

A comprehensive test platform for fluorescence microscope objective lenses, comprising a bottom plate (1), wherein a horizontal adjustment device and a vertical fixing mechanism are provided on the bottom plate (1); the horizontal adjustment device comprises a two-dimensional translation stage (2) and a two-dimensional tilting stage (3) stacked in sequence; a reticle (4) is provided on the two-dimensional tilting stage (3); the vertical fixing mechanism comprises a back plate (6), and the back plate (6) is fixedly connected onto the bottom plate (1); an optical detection device and a guide sliding device (7) in the vertical direction are separately fixedly provided on the back plate (6); and a sliding support (8) that can slide along the guide sliding device is provided on the guide sliding device (7), and a measuring objective lens (5) is fixed on the sliding support (8).

5 Claims, 3 Drawing Sheets

(56) References Cited

U.S. PATENT DOCUMENTS

| | | | | |
|---|---|---|---|---|
| 7,095,032 B2* | 8/2006 | Montagu | ............ | G01N 21/6458 |
| | | | | 250/458.1 |
| 9,646,732 B2* | 5/2017 | Adler | ........................ | G21K 7/00 |
| 2001/0027595 A1* | 10/2001 | Saiki | ................... | G03F 7/70716 |
| | | | | 29/25.01 |
| 2018/0003484 A1* | 1/2018 | Goodwin | ........... | G01B 9/02032 |

FOREIGN PATENT DOCUMENTS

| | | | | | |
|---|---|---|---|---|---|
| CN | 109282971 A | * | 1/2019 | ........ | G01M 11/0207 |
| CN | 110425976 A | * | 11/2019 | | |
| JP | 2004014915 A | * | 1/2004 | ........... | G02F 1/1303 |
| JP | 2004165218 A | * | 6/2004 | | |
| JP | 3590916 B2 | * | 11/2004 | | |
| JP | 2010192562 A | * | 9/2010 | | |

* cited by examiner

COMPREHENSIVE TEST PLATFORM FOR FLUORESCENCE MICROSCOPE OBJECTIVE LENSES

PRIORITY CLAIM AND RELATED APPLICATIONS

This national stage application claims the benefit of priority from PCT/CN2020/091355 filed on Dec. 31, 2019. Said application is incorporated by reference in its entirety.

BACKGROUND OF THE INVENTION

1. The Field of the Invention

The invention relates to the field of optical detection and more specifically to a fluorescence microscope objective comprehensive test platform.

2. Background Art

A fluorescence microscope is a basic tool for observing immunofluorescence cytochemistry and includes a light source, a filter plate system and an optical system. It utilizes light with a certain wavelength to excite specimen to emit fluorescence. A fluorescence microscope for observing a specimen by amplification of an objective lens and an eyepiece system requires a water layer and cover glass when observing specimens.

Based on the comprehensive detection platform of the fluorescence microscope objective lens, the related modules can be replaced and the active adjustment function can be realized. Before the fluorescence microscope objective lens is installed and adjusted, the eccentricity of the lens on the eccentric meter is adjusted and then the star point plate is used for controlling the related aberration detection equipment. The testing equipment includes a transfer function instrument, interferometer, optical bench, etc. These equipment and methods are inefficient, difficult to install and test, the equipment is expensive and the integrated imaging energy of the microscope objective cannot be truly reflected.

SUMMARY OF THE INVENTION

In accordance with the present invention, there is provided a comprehensive test platform for a fluorescence microscope objective, which can visually and rapidly assist in mounting and adjustment of the eccentricity of a lens and has the advantages of high precision, high speed, wide application range and the like.

In order to achieve the purpose, the technical scheme adopted by the invention is as follows: The comprehensive test platform for fluorescent microscopic objective lens includes a bottom plate on which a horizontal adjustment device and a vertical fixing mechanism are disposed. The horizontal adjustment device includes a two-dimensional translation stage and a two-dimensional tilting stage stacked in sequence. A reticle is provided on the two-dimensional tilting stage. The vertical fixing mechanism includes a back plate fixedly connected to the base. An optical detection device and a guide sliding device in the vertical direction are respectively fixed on the back plate. The guide sliding device is provided with a sliding support capable of sliding along the guide sliding device and the objective lens to be measured is fixed on the sliding support, wherein the optical detection device includes a camera, a lens barrel and a mirror which are sequentially and coaxially connected. The test platform further includes a light source connected to a side surface of the mirror. The measured objective lens and the reticle are disposed along the axis of the camera and the lens barrel. The light emitted by the light source is partially reflected by the mirror after being reflected by 90 degrees by the beam splitter. The reflected light irradiates the reticle after passing through the objective lens to be measured. The light part reflected back by the reticle is transmitted from the mirror and then is received by the camera after passing through the lens barrel to be finally imaged, wherein an equivalent glass cover sheet is attached to the reticle to simulate the water layer and cover glass when the objective lens is actually used. When target components are manufactured, the designed equivalent cover glass can be pasted on a differentiation plate to simulate a water layer and cover glass when the objective lens is actually used so that the target components can be reused, greatly reducing the cost. The guide sliding device includes a guide rail, a sliding block capable of moving along the guide rail and a knob screw for adjusting the movement of the sliding block. The sliding block is fixedly connected with the sliding support. The bottom plate includes support legs with adjustable horizontal height.

PARTS LIST

1—bottom plate
2—two-dimensional translation stage
3—two-dimensional tilting stage
4—reticle
5—objective lens
6—back plate
7—guide sliding device
8—sliding support
11—support legs
71—guide rail
72—sliding block
73—knob screw
74—cross beam
81—camera
82—lens barrel
83—mirror
84—light source
85—beam splitter

PARTICULAR ADVANTAGES OF THE INVENTION

The present invention uses an optical detection device to detect the imaging quality of the detected objective lens, the detection result can be obtained in real time by the camera and the detection efficiency is high. The levelness of the reticle is precisely adjusted through the two-dimensional translation stage and the two-dimensional tilting stage, ensuring the effectiveness of measurements subsequently taken. The designed equivalent cover glass is pasted on the reticle to simulate the water layer of the objective lens in actual use, so that it can be reused and greatly reduce the cost. The designed equivalent cover glass is pasted on the reticle to simulate a water layer when the objective lens is actually used, so that the objective lens can be reused and the cost is greatly reduced. The measured objective lens is axially moved through the guide sliding device, so that the imaging effects of different positions can be detected and abundant measuring data can be provided for subsequent calculation of related indicators.

DETAILED DESCRIPTION OF A PREFERRED EMBODIMENT

Figure 1:
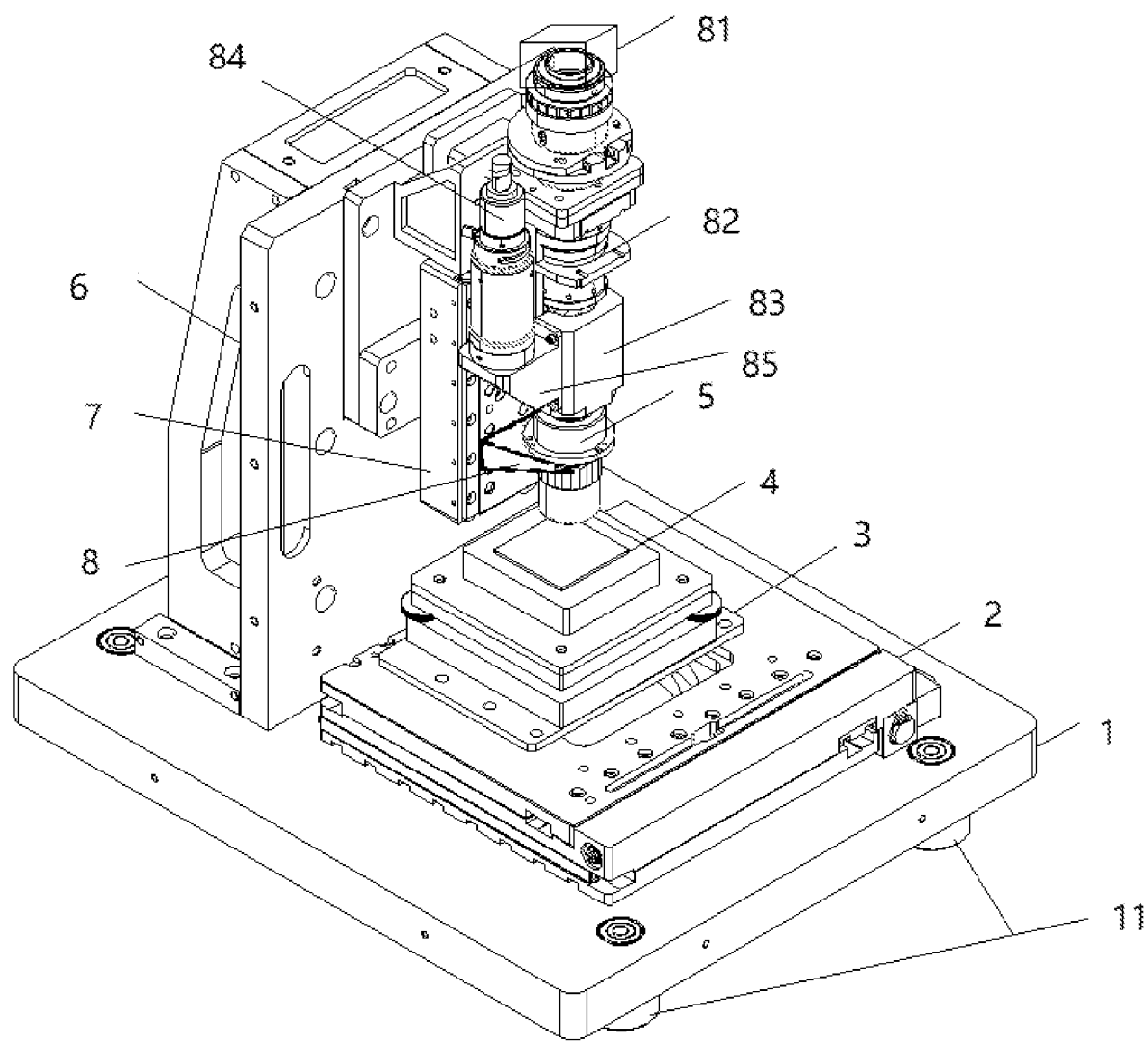
FIG. 1 is a schematic structural view of a fluorescence microscope objective integrated test platform according to the present invention.
Figure 2:
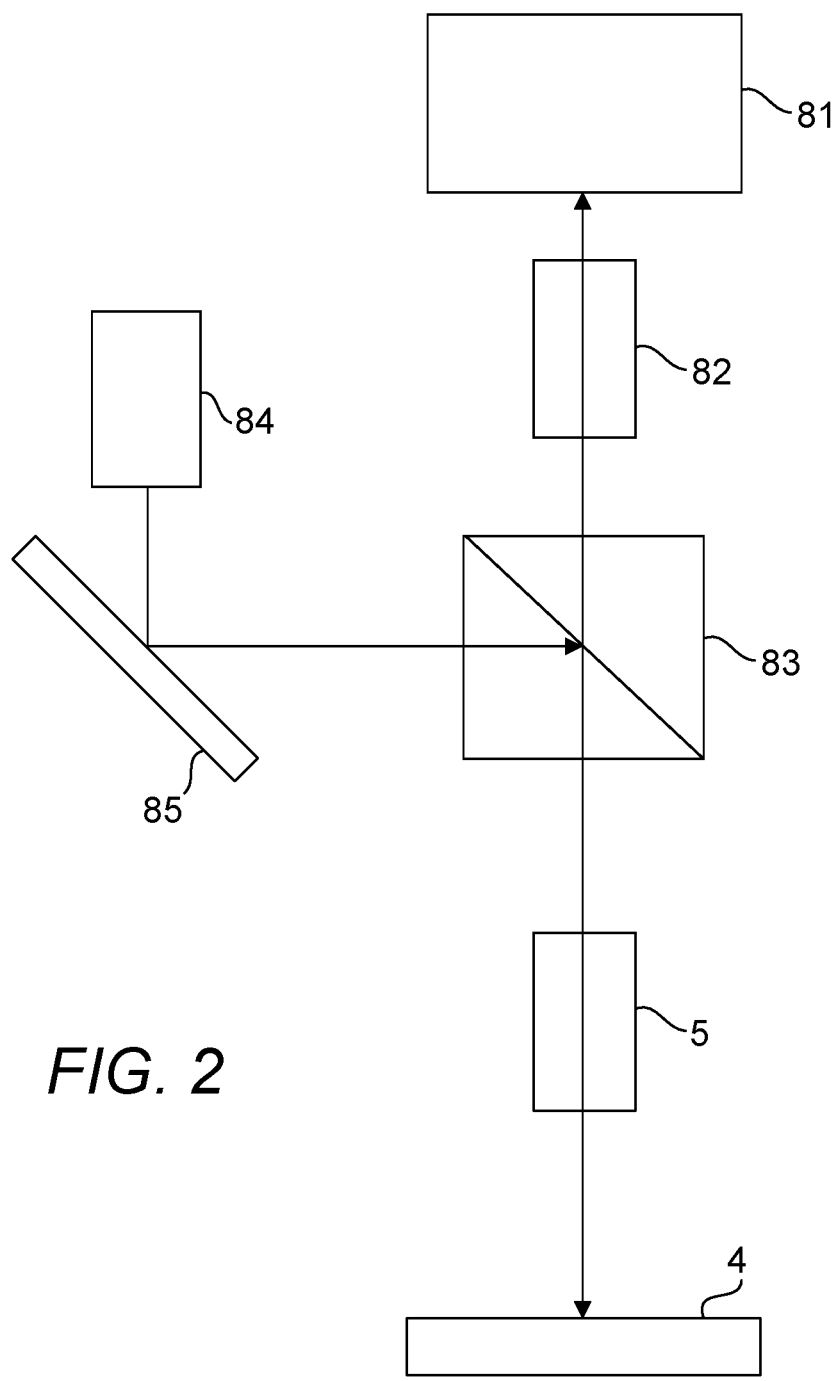
FIG. 2 is an optical path diagram of a fluorescence microscope objective integrated test platform according to the present invention.
Figure 3:
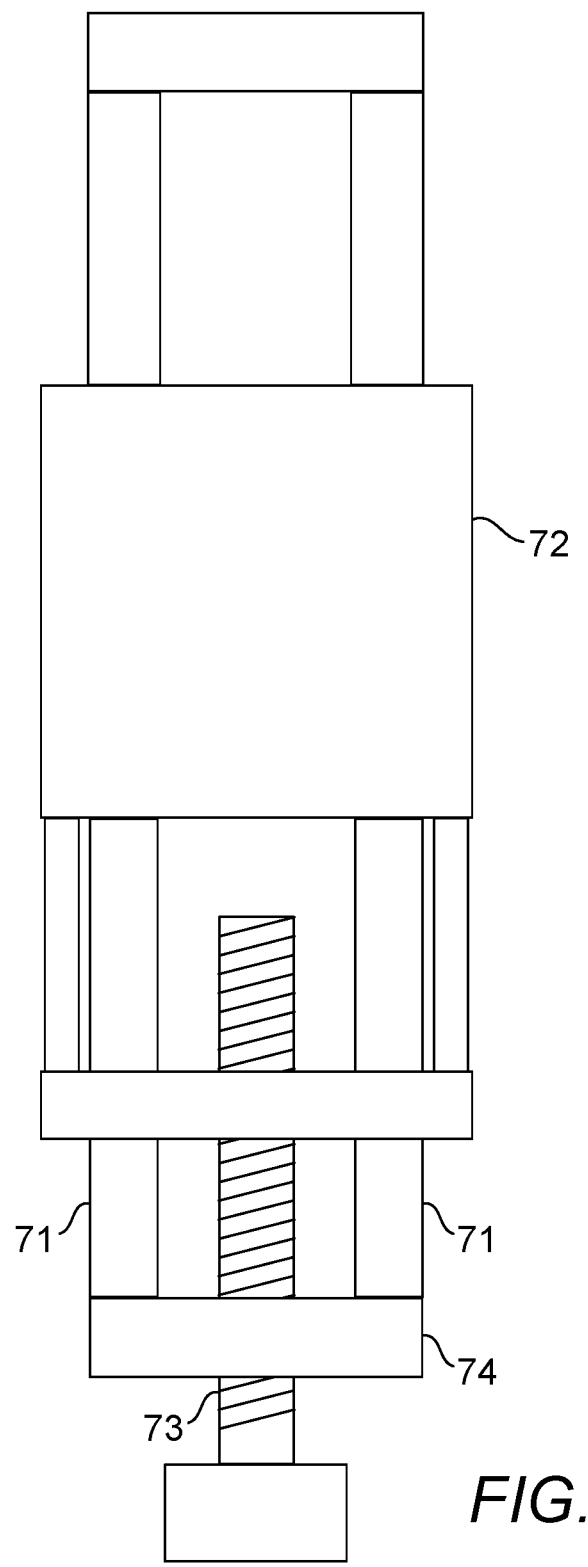
FIG. 3 is a schematic diagram of a guide sliding device of a fluorescence microscope objective comprehensive test platform according to the present invention.

The present invention will be further described below in conjunction with the accompanying drawings of the specification. As shown in FIGS. 1-3, the comprehensive test platform for the fluorescence microscope objective includes a bottom plate 1, wherein support legs 11 are respectively arranged at four corners of the bottom plate 1 and are connected with the bottom plate 1 through threads and the depth of the support legs 11 extending into the bottom plate 1 can be adjusted, so that the overall horizontal adjustment of the bottom plate 1 can be realized.

A horizontal adjusting device and a vertical fixing mechanism are arranged on the bottom plate 1. The horizontal adjusting device includes a two-dimensional translation stage 2 and a two-dimensional tilting stage 3 which are sequentially stacked, wherein the two-dimensional translation stage 2 can move horizontally, the two-dimensional tilting stage 3 provides inclination adjustment in the vertical direction. A reticle 4 is provided on the two-dimensional tilting stage 3. Through the adjustment of the two-dimensional translation stage 2 and the two-dimensional tilting stage 3, the level and the inclination of the reticle 4 can be adjusted to meet the test requirements. An equivalent glass cover sheet is attached to the reticle 4, which can simulate the water layer and cover glass when the objective lens is actually used. In this way, the reticle 4 can be reused every time the objective lens 5 to be tested is tested and there is no need to remake.

The vertical fixing mechanism includes a back plate 6 fixedly connected on the base 1. An optical detection device and a vertical guide sliding device 7 are respectively fixed on the back plate 6. A sliding support 8 is arranged on the guide sliding device 7 where the sliding support 8 is capable of sliding along the guide sliding device 7. When the tested objective lens 5 is fixed on the sliding support 8 and is tested, the movement of the tested objective lens 5 on the detection optical axis is controlled by the guide sliding device 7.

The optical detection device includes a camera 81, a lens barrel 82 and a mirror 83 which are sequentially and coaxially connected. The optical detection device further includes a light source 84 connected with a side surface of the mirror 83 through a beam splitter 85. An objective lens 5 to be detected and a reticle 4 are arranged on the axis of the camera 81 and the lens barrel 82.

The process for measuring the objective lens 5 to be measured is as follows: The light emitted from the light source 84 is reflected by the beam splitter 85 at 90 degrees and then partially reflected by the mirror 83 at 90 degrees, passes through the objective lens 5 to be measured and irradiates the reticle 4. The light part reflected by the reticle 4 is transmitted from the mirror 83, then passed through the lens barrel 82 and received by the camera 81 and the final imaging result can be further processed, so that the parameter measurement of the measured objective lens 5 can be completed. The guide sliding device 7 includes a guide rail 71, a sliding block 72 movable along the guide rail and a knob screw 73 for adjusting the movement of the sliding block. The sliding block 72 is fixedly connected to the sliding support 8. The two tracks of the guide rail 71 are connected by a cross beam 74. The knob screw 73 is connected with the cross beam 74 and the sliding block 72 through threads. The knob screw 73 can be manually rotated to drive the sliding block 72 to move along the guide rail 71 to realize the measurement of different positions of the objective lens 5 under test.

What is claimed herein is:

1. A fluorescence microscope objective comprehensive test platform comprising a bottom plate, a horizontal adjusting device and a vertical fixing mechanism both arranged on the bottom plate, a reticle, an optical detection device, a guide sliding device, wherein the horizontal adjusting device comprises a two-dimensional translation stage and a two-dimensional tilting stage which are sequentially stacked, the reticle is arranged on the two-dimensional tilting stage, the vertical fixing mechanism comprises a back plate fixedly connected to the bottom plate, the optical detection device and the guide sliding device are disposed along a vertical direction and are respectively fixed on the back plate, the guide sliding device further comprises a sliding support configured to slide along the guide sliding device and an objective lens to be measured is secured to the sliding support and the objective lens is disposed along an optical path between the optical detection device and the reticle, wherein the two-dimensional tilting stage is configured to provide an inclination adjustment of the reticle.

2. The fluorescence microscope objective comprehensive test platform of claim 1, wherein the optical detection device comprises a camera, a lens barrel and a mirror all of which are sequentially and coaxially connected and a light source, the light source is connected to a side surface of the mirror, the measured objective lens and the reticle are disposed along the axis of the camera and the lens barrel, a light emitted by the light source is partially reflected by the mirror after being reflected by 90 degrees by the beam splitter, the reflected light irradiates the reticle after passing through the objective lens to be measured, the light part reflected back by the reticle is transmitted from the mirror and then is received by the camera after passing through the lens barrel to be finally imaged.

3. The fluorescence microscope objective comprehensive test platform of claim 1, wherein an equivalent glass cover sheet is pasted on the reticle to simulate the water layer and cover glass when the objective lens is actually used.

4. The fluorescence microscope objective comprehensive test platform of claim 1, wherein the guide sliding device comprises a guide rail, a sliding block configured to move along the guide rail, a knob screw configured to adjust the movement of the sliding block, the sliding block is fixedly connected to the sliding support.

5. The fluorescence microscope objective comprehensive test platform of claim 1, wherein the bottom plate comprises support legs with adjustable horizontal height.

* * * * *